(No Model.)
L. SWENSSON.
HORSE DETACHER.
No. 421,148. Patented Feb. 11, 1890.
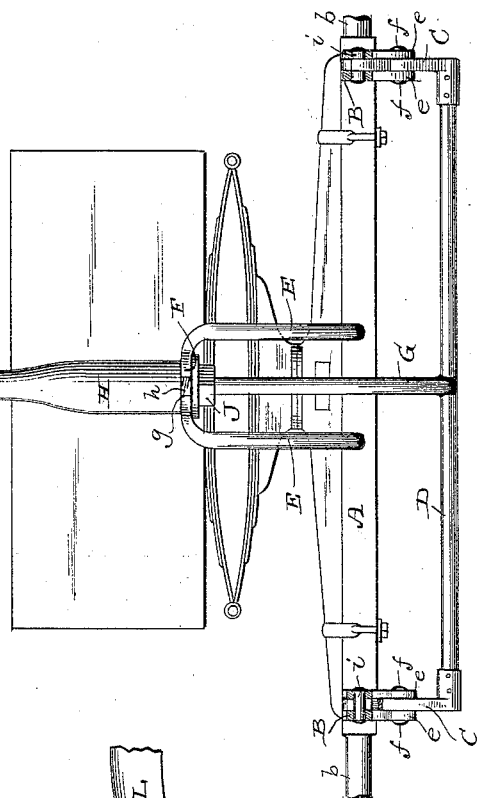
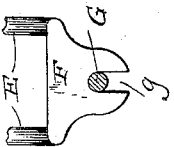
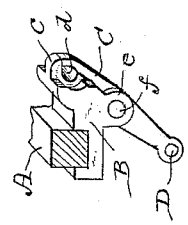
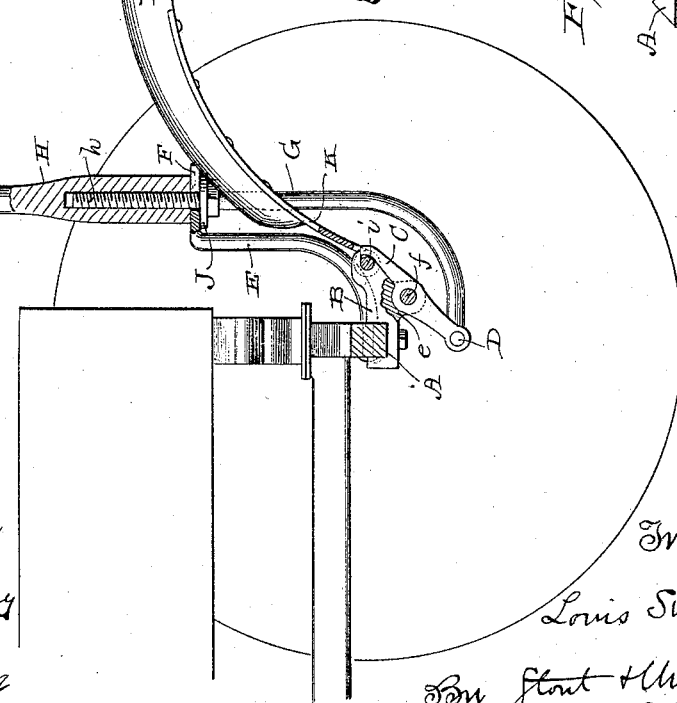
Witnesses
Geo. W. Young
Wm Klug
Inventor
Louis Swensson
By Stout & Underwood
Attorneys

UNITED STATES PATENT OFFICE.

LOUIS SWENSSON, OF RACINE, WISCONSIN.

HORSE-DETACHER.

SPECIFICATION forming part of Letters Patent No. 421,148, dated February 11, 1890.

Application filed June 17, 1889. Serial No. 314,576. (No model.)

*To all whom it may concern:*

Be it known that I, LOUIS SWENSSON, of Racine, in the county of Racine, and in the State of Wisconsin, have invented certain new and useful Improvements in Horse-Detachers; and I do hereby declare that the following is a full, clear, and exact description thereof.

My invention relates to devices for detaching horses from vehicles; and it consists in certain peculiarities of construction and combination of parts, to be hereinafter described with reference to the accompanying drawings and subsequently claimed.

In the drawings, Figure 1 represents a side elevation of my device, partly in section and applied to a vehicle; Fig. 2, a front elevation of the same, partly in section; Fig. 3, a perspective detail view of a coupling that forms part of my invention, and Fig. 4 an under side view of a yoke that also forms part of my invention.

Referring by letter to the drawings, A represents the fore axle of a vehicle, and fitted to this axle, adjacent to the wheel-spindles $b$, are couplings B, provided with tongues $c$, having concave recesses $d$, and said couplings are also provided with depending ears $e$, that serve as bearings for trunnions $f$ on lever-arms C, the latter being rigidly connected to the ends of a transverse rod D, parallel to said axle.

Rigidly secured to the axle A are the ends of a central upwardly-extended yoke E, and this yoke has a horizontal extension F, provided with a slot $g$ for engagement with a vertical rod G, that has its lower end rigidly connected to the center of rod D, and its upper end provided with screw-threads $h$ for engagement with corresponding threads in a stem H, the latter being surmounted by a hand lever or wheel I.

The stem H is provided with a collar or jam-nut J, that normally impinges against the under side of the extension F of the yoke E, and when the stem H is screwed down said extension is clamped between this stem and the collar or jam-nut.

Bolts $i$ are inserted in eyes on straps K, connected to thills L; or in case my device is employed in connection with a two-horse vehicle said straps would be secured to the ends of a tongue-bow. The bolts $i$ fit the concave recesses $d$ in the tongue $c$ on the couplings B, and are held against withdrawal by the lever-arms C on the rod D, said lever-arms being adjusted and held in position to effect this result by drawing the rod G back into the slot $g$ in the yoke-extension F and clamping the latter between the stem H and collar or jam-nut J.

As shown by the drawings, my invention is preferably applied to a vehicle having its fore axle connected to a fifth-wheel, and in case the horse or team attached to the vehicle should run away the driver can guide said horse or team by actuating the stem H so as to swing said axle on its pivot in either direction.

To disconnect the thills or pole from the vehicle, and thereby detach the horse or team, the stem H is run up on the rod G away from the yoke-extension F to unlock said rod and leave the lever-arms C free to yield to the pressure of the pins $i$, whereby the latter are freed from the concave recesses $d$ in the tongues $c$ on the couplings B and the desired result accomplished.

Having thus described my invention, what I claim as new, and desire to secure by Letters Patent, is—

1. The combination, with a vehicle fore axle, of couplings rigidly connected thereto and provided with recesses, thill-bolts engaged by the recesses, arms trunnioned to the couplings and united by a transverse rod, an upwardly-extended yoke connected to the axle and provided with a horizontal extension, a vertical rod connected to the transverse one and normally engaged by the slot in the yoke-extension, a collar or nut arranged on the vertical rod to bear against the under side of the yoke-extension, and a stem screw-threaded to the latter rod above said yoke-extension, substantially as set forth.

2. The combination, with a vehicle fore axle, of couplings rigidly secured thereto and provided with tongues having concave recesses, thill-bolts engaged by the recesses, lever-arms trunnioned to the couplings and united by a transverse rod, an upwardly-extended yoke connected to the axle and provided with a slotted horizontal extension, a vertical rod connected to the transverse one and normally engaged by the slot in the yoke-extension, a collar or nut arranged on the vertical rod to bear against the under side of the yoke-extension, and a stem screw-threaded to the latter rod above said yoke-extension, substantially as set forth.

3. The combination, with a vehicle fore axle, of the couplings B, secured thereto and provided with the recessed tongues *c* and ears *f*, the arms C, trunnioned to said ears, the rod D, connecting said arms, the yoke E, connected to said axle and provided with the horizontal extension F, having the slot *g* therein, the rod G, secured to the one D and normally engaged with said slotted yoke-extension, the stem H and nut J, arranged on said rod G to impinge on opposite sides of the yoke-extension, and thills provided with bolts for engagement with the recessed couplings, substantially as set forth.

In testimony that I claim the foregoing I have hereunto set my hand, at Racine, in the county of Racine and State of Wisconsin, in the presence of two witnesses.

LOUIS SWENSSON.

Witnesses:
J. F. BICKEL,
M. C. ARMOUR.